May 10, 1966

C. F. ALEXANDER, JR
OUTBOARD STERN DRIVE FOR BOATS AND
HYDRAULIC SHOCK ABSORBER THEREFOR 3,250,501

Filed Sept. 17, 1964

INVENTOR.
CHARLES F. ALEXANDER JR.
BY
Andrus & Starke
Attorneys

INVENTOR.
CHARLES F. ALEXANDER JR.
BY
Andrus & Starke
Attorneys

May 10, 1966

C. F. ALEXANDER, JR 3,250,501

OUTBOARD STERN DRIVE FOR BOATS AND
HYDRAULIC SHOCK ABSORBER THEREFOR

Filed Sept. 17, 1964

INVENTOR.
CHARLES F. ALEXANDER JR.
BY
Andrus & Starke
Attorneys

United States Patent Office 3,250,501
Patented May 10, 1966

3,250,501
OUTBOARD STERN DRIVE FOR BOATS AND HYDRAULIC SHOCK ABSORBER THEREFOR
Charles F. Alexander, Jr., Oshkosh, Wis., assignor to Kiekhaefer Corporation, Fond du Lac, Wis., a corporation of Delaware
Filed Sept. 17, 1964, Ser. No. 397,134
2 Claims. (Cl. 248—4)

This invention relates to an outboard stern drive for boats and hydraulic shock absorber therefor.

In the construction of outboard motors it has been known in Patent No. 2,953,335 to employ hydraulic shock absorbers to remove the energy of the tilt movement of the motor upon engagement with an underwater obstruction while the boat is moving forward at high speed, so that damage to the motor and the transom is avoided.

In such constructions the total tilt movement generally permissible may be as high as 80 or 90 degrees, and it is possible to permit the underwater structure of the motor to clear the obstruction before applying the major energy absorbing forces.

A different condition arises in regard to outboard stern drives wherein the tilt movement may be limited to less than 60 degrees due to the universal drive connection with the shaft from the inboard engine. The tilt axis is always low and the 60 degrees of tilt is just enough to provide for clearance of the obstruction. Furthermore, the mass of the motor is not involved in the tilt movement.

The objective of preventing undue stress upon the transom or damage to the stern drive can be realized by absorbing the energy as the unit tilts and the underwater structure rides over the obstruction. For this purpose it is desirable to apply a resistance to tilt that is more nearly constant over the entire range of tilt movement.

Hydraulic shock absorbers, as they are constructed for automobiles and other uses generally have a peak resistance at some portion of the stroke and are not designed to give a more constant resistance throughout the stroke.

In carrying out the present invention a hydraulic shock absorber is provided that has a more constant resistance throughout the stroke having regard to the changing geometric pattern of the mounting and the speed of angular tilt movement. This is accomplished by pre-loading the shock absorber valve spring so that the liquid flow past the piston requires a high pressure build up at all times.

The particular shock absorber employed is of the single piston-cylinder type with by-pass ports for the piston and wherein the flow of liquid through the ports is restricted by a disk spring facing the discharge end of the ports. The disk is dished to simulate a Belleville spring by casting a concave face for the piston and then forcing a flat disk to take the shape of the concave surface. In this way mass production is accomplished, without the variables usually accompanying mass production of Belleville springs.

The accompanying drawings illustrate the best mode presently contemplated by the inventor for carrying out the invention.

Figures 1, 2:
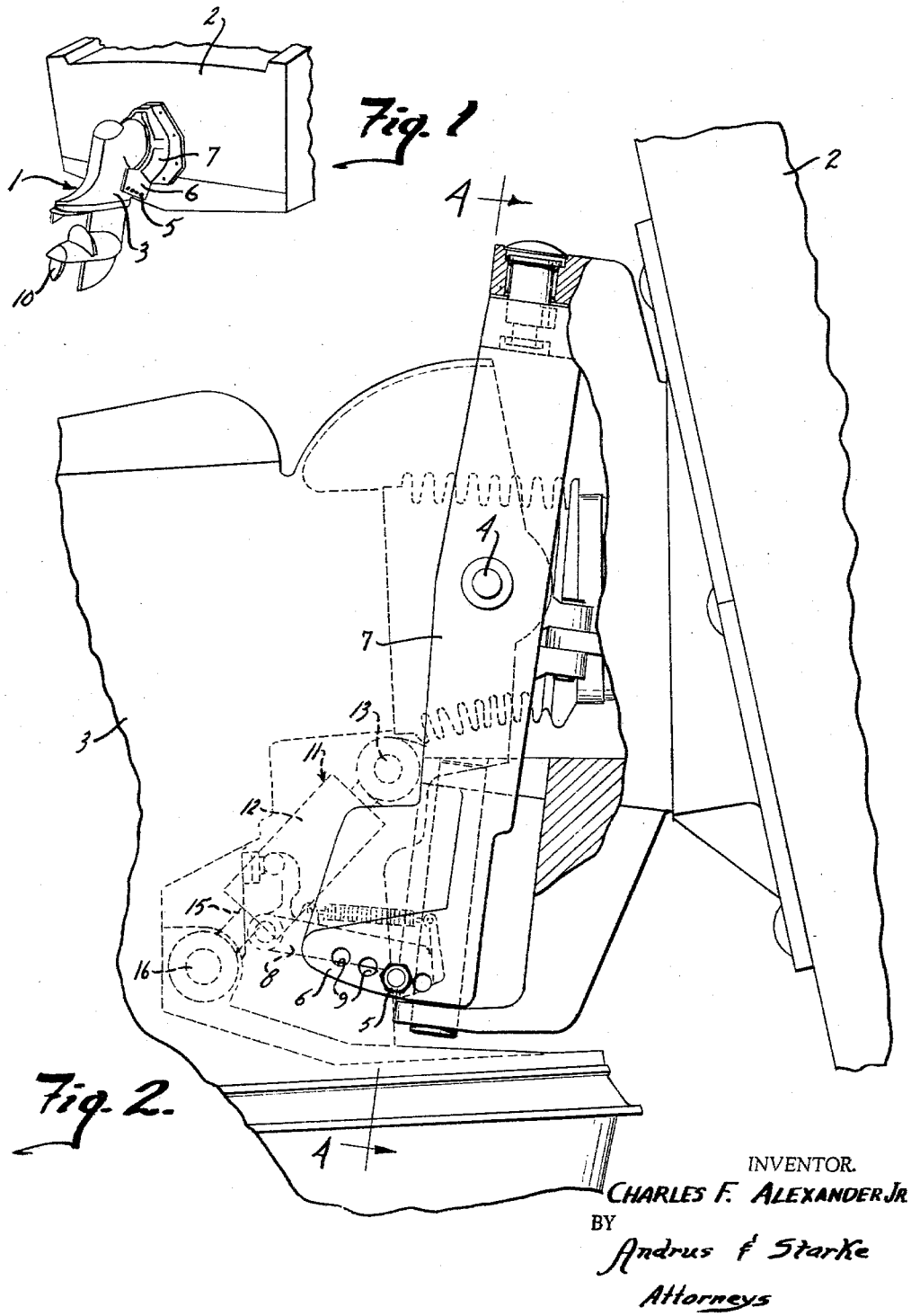
FIGURE 1 is a perspective view of the stern of a boat showing the transom and the outboard stern drive secured thereto.
FIG. 2 is an enlarged side elevation with parts broken away, and showing the parts as when in normal drive.
Figure 3:
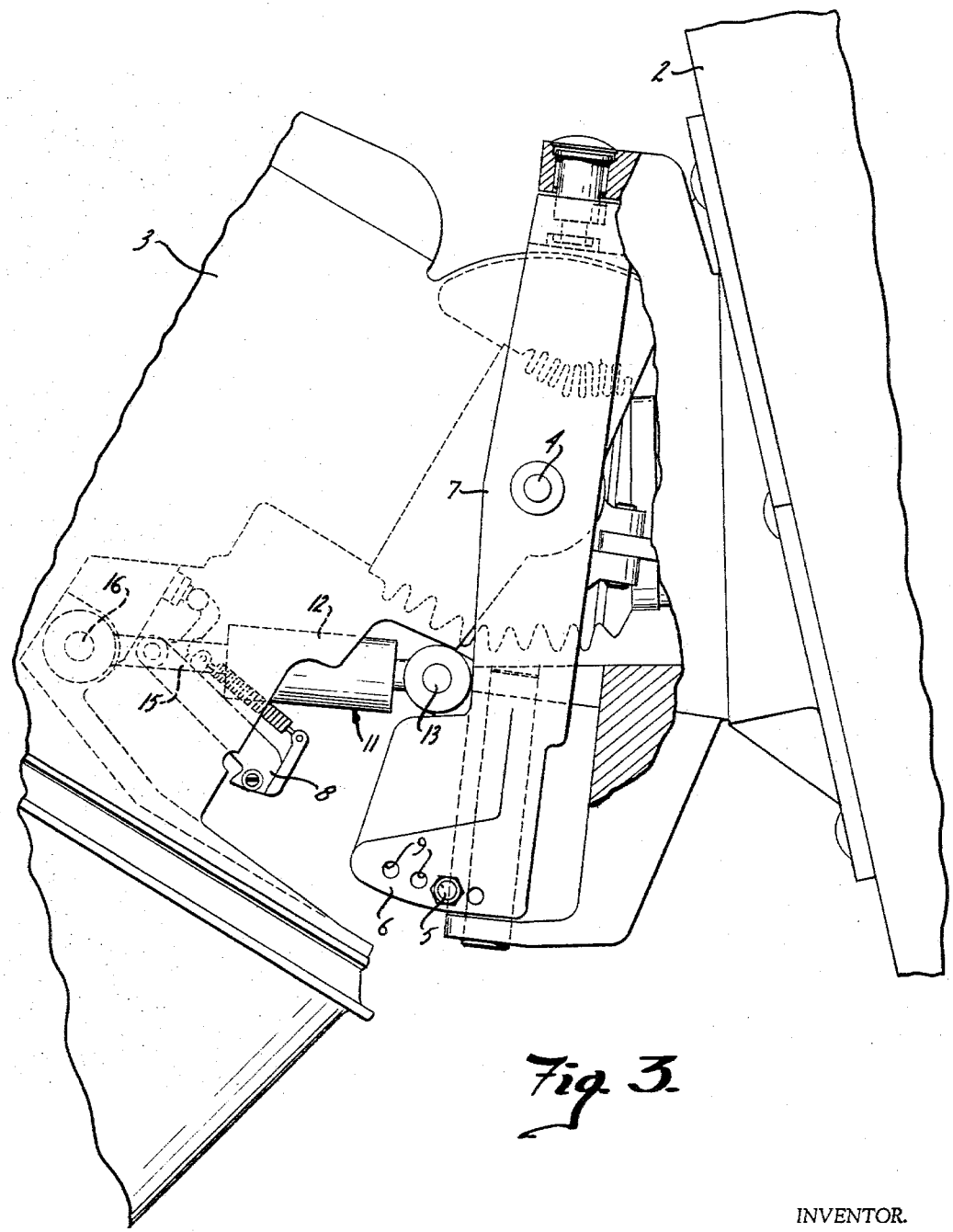
FIG. 3 is a view similar to FIG. 2 showing the propulsion unit tilted upwardly as when engaging an underwater obstruction.
Figure 4:
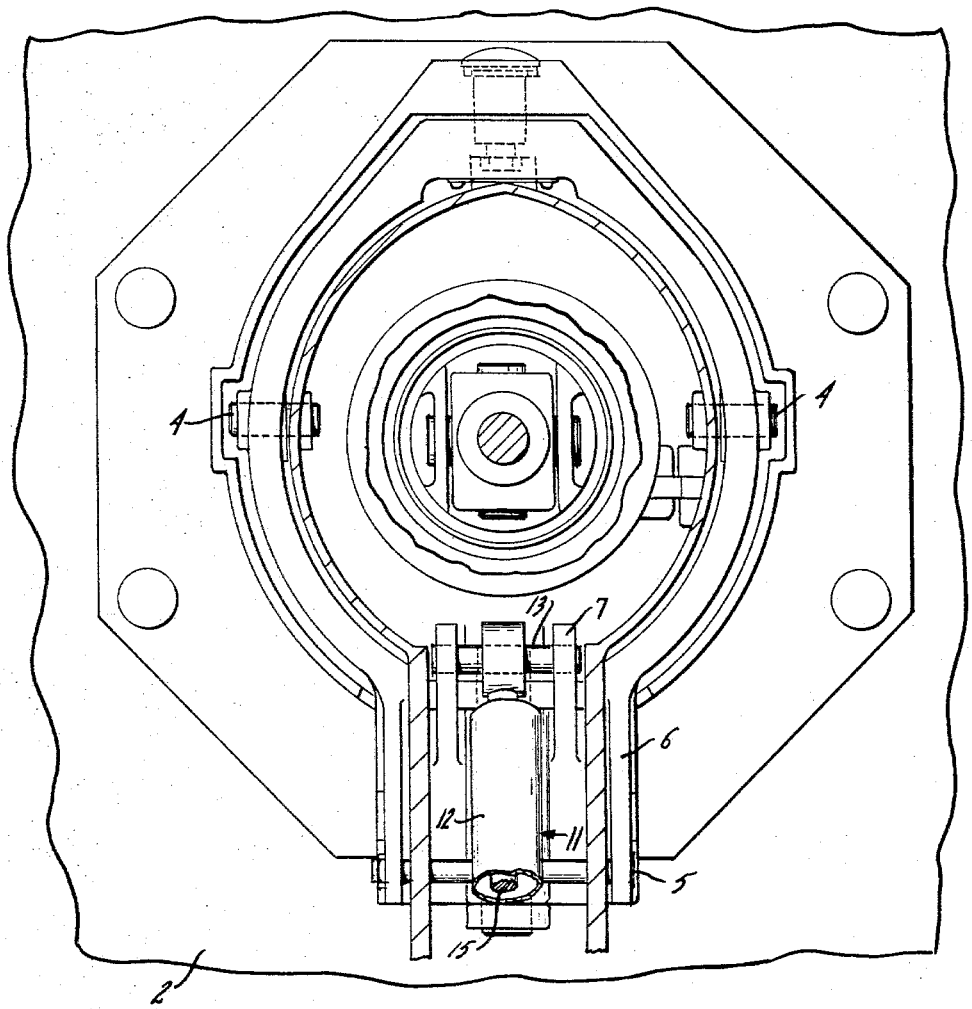
FIG. 4 is a transverse section taken generally on line 4—4 of FIG. 2.
Figure 5:
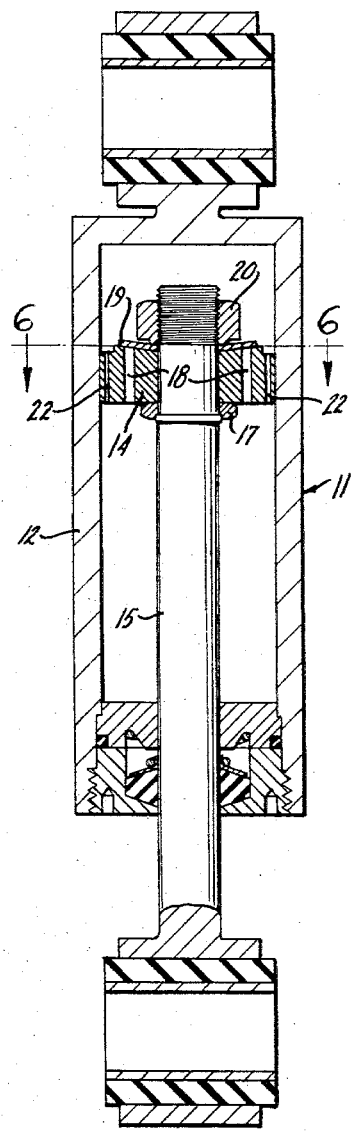
FIG. 5 is an enlarged axial section of the shock absorber.
Figure 6:
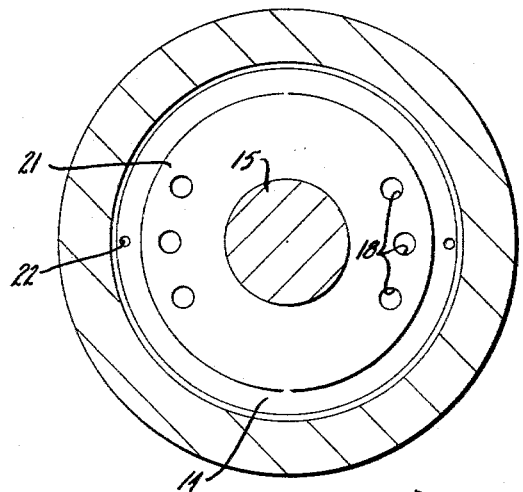
FIG. 6 is an enlarged section taken generally on line 6—6 of FIG. 5 and showing the end face of the piston.
Figure 7:
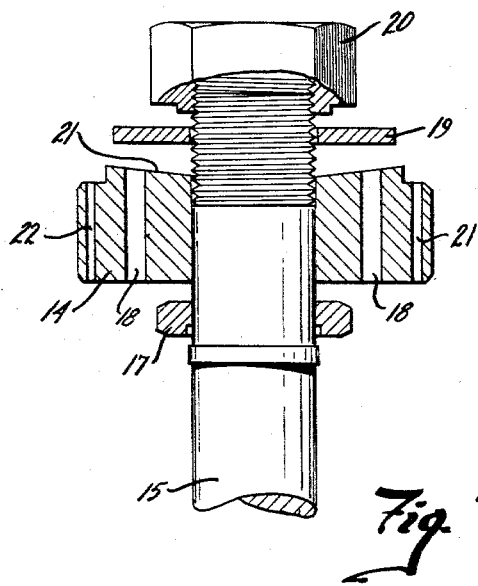
FIGURE 7 is an enlarged detail section of the piston showing the flat disk and nut prior to tightening the same thereon.

The outboard stern drive 1 is suitably secured to the transom 2 of a boat and has a propulsion unit 3 that is dirigibly mounted for steering.

The propulsion unit 3 is additionally pivotally mounted for vertical tilt movement on a substantially horizontal transverse axis 4 in the event it strikes an underwater obstruction.

The propulsion unit 3 is positioned for forward thrust of the boat by a suitable adjustment pin or bolt 5 selectively inserted in corresponding openings in each of the spaced flange members 6 of the mounting bracket 7.

The usual spring release latch member 8, releasably secures the unit 3 to the bolt 5.

Each bracket flange 6 has a series of corresponding openings 9 in which the bolt 5 may be selectively located to dispose the unit 3 at the right vertical position for operation of the propeller 10.

The latch 8 is spring loaded so that it will retain the unit 3 in its adjusted position during normal reversal of the propeller, but will release upon striking of an underwater obstruction during forward travel, to let the unit 3 tilt upwardly.

Free upward tilting of the unit 3 after release of latch 8 might result in breaking of parts including drive connections unless limited as by an abutment. The use of an abutment with the short lever arms present can readily overstress the transom or parts involved unless the tilt velocity is substantially reduced during the tilting movement.

In carrying out the present invention a hydraulic shock absorber 11 is disposed between propulsion unit 3 and bracket 7.

The shock absorber 11 comprises a cylinder 12 pivotally secured at its upper end to bracket 7 as by the axis pin 13, a piston 14 in cylinder 12, and a piston rod 15 pivotally secured at its outer end to the unit 3 as by the axis pin 16.

The cylinder 12 is sealed at both ends and filled with a relatively incompressible liquid when the piston 14 is at the inner upper end of the cylinder.

The piston 14 is secured against a flange or shouldered washer 17 on rod 15 and which supports the piston on the rod near the end of the latter. The piston 14 has a plurality of orifices or ports 18 therethrough for the restricted transmission of liquid from below to above the piston as the latter is drawn outwardly or downwardly in the cylinder as when the propulsion unit 3 strikes an obstruction and is tilted rearwardly upon axis 4.

In order to restrict the flow of fluid through the ports 18 a spring disk 19 is disposed against the upper face of piston 14 and serves to cover the ports 18 at all times except when the pressure of the fluid beneath the piston exceeds any pressure of the fluid above the piston sufficiently to lift the spring 19 from the mouth of the ports.

A nut 20 is threaded upon the upper end of piston rod 15 and secures the spring 19 tightly upon piston 14 and the latter in fixed position against flange 17 upon rod 15.

In carrying out the invention, having consideration for the necessarily short piston stroke involved in the short angular tilt of unit 3, and the limited cylinder size to accommodate the space requirements in the unit, it has been found that the use of a flat spring disk gives a peak type of fluid pressure curve in the cylinder beneath the piston so that it is difficult if not impossible at higher speeds to absorb the energy of impact within the range of the piston stroke.

It has been found desirable to provide the characteristics of a Belleville spring closure for ports 18 in order that a more desirable maximum fluid pressure is retained in the cylinder space beneath the piston throughout the stroke of the piston.

Belleville springs are difficult to manufacture by mass production methods, and often vary in characteristics after such production. To overcome this difficulty, the present invention in a more specific detail employs a flat spring disk 19 and casts a concave or dished face 21 on the upper side of piston 14 into which the disk 19 is pressed by nut 20 to simulate the shape of a Belleville spring. In this way springs 19 can be reliably provided with predetermined Belleville spring characteristics in mass production.

In operation as the unit 3 strikes an obstruction with the boat traveling forward at high speed, the unit immediately starts a rearward tilting movement which moves the piston 14 downwardly in cylinder 12 thereby forcing liquid beneath the piston through ports 18 and lifting springs 19 on the inner face of the piston. As the tilting movement progresses the unit slows in angular velocity until it passes the obstruction or reaches the maximum angle of tilt. During this time, which is only a fraction of a second, the liquid flow through the ports 18 is restricted by the spring disk 19 to provide a reasonably constant pressure drop across the piston to give maximum energy absorption for a given size shock absorber.

Upon reaching the end of the tilt movement the unit reverses and returns to its former drive position by gravity. During this return movement the spring 19 is seated and blocks the return flow of liquid through the ports 18. The return of the liquid to the lower side of the piston is effected through one or more small piston bypass orifices 22 which may be located near the periphery of the piston 14 and which are of a total size sufficient to let gravity return the unit into the water without appreciable delay. After the propeller enters the water it will aid in the return movement of the unit until the thrust of the unit is transmitted to the pin 5, at which time the latch 8 will engage the pin and hold the unit in drive position.

By employing a control for fluid flow through ports 18 that is responsive to fluid pressure differential on opposite sides of the piston during upward tilt of the unit, as by the Belleville spring 19, and relating the same to the geometry of the mounting, i.e. the relative location of pivots 13 and 16 with respect to the tilt axis 4, it is possible to obtain a substantially constant rate of energy absorption throughout the range of permissible tilting movement.

The pivotal axes 13 and 16 connecting the shock absorber to the bracket 7 and unit 3, respectively, should be disposed relative to the tilt axis 4 to provide an increase in velocity of piston movement with a constant tilt velocity so that as the tilt movement progresses and reduces in speed the geometry of the mounting will maintain a more nearly constant velocity of piston movement.

The invention by reason of absorbing substantially all of the energy arising from the impact or engagement with the obstruction, protects the drive mechanism, unit and boat from damage.

Various modes of carrying out the invention are contemplated as being within the scope of the following claims particularly pointing out and distinctly claiming the subject matter which is regarded as the invention.

I claim:

1. In an outboard drive for boats having a dirigible propulsion unit pivotally mounted to the boat on a substantially horizontal transverse axis to provide for rearward and upward tilting of the unit upon striking of an underwater obstruction, a hydraulic shock absorber comprising a cylinder filled with incompressible liquid and a piston in said cylinder having a piston rod extending from one end of the cylinder, means pivotally connecting the outer end of said piston rod and the opposite end of said cylinder correspondingly to said propulsion unit and said boat, said connecting means being disposed relative to the tilt axis to effect an increasing actuation of the shock absorber as the tilt movement progresses and reduces in velocity to provide a nearly constant resistance to the tilt movement throughout the range of permissible tilting of the unit, means bypassing said piston to restrict the transmission of liquid from either side thereof to the other depending upon the direction of piston movement in said cylinder, a port in said piston, and means to close said port against flow of liquid therethrough upon return movement of the unit following a rearward and upward tilting thereof, said port closure means comprising a flat metal disk spring tightly secured against the inner face of said piston and covering said port, and the inner face of said piston being dished to flex said disk into a Belleville spring shape when secured thereto whereby said flat disk simulates the characteristics of a Belleville spring and resists the opening of the port for flow of liquid therethrough during the tilting movement of the unit.

2. In apparatus of the class described, a shock absorber comprising a cylinder filled with incompressible liquid, a piston disposed to move therein under load and having a port therethrough for flow of liquid from one side thereof to the other in response to the piston movement, and a substantially flat spring disk secured against the inner face of said piston and normally closing said port but flexing to resistively permit the flow of liquid therethrough when the piston moves in a direction opposite the disk, said inner face of said piston being concave to receive said spring disk and dish the same to simulate the shape and characteristics of a Belleville spring.

References Cited by the Examiner

UNITED STATES PATENTS 3,003,724 10/1961 Kiekhaefer _____ 248—4
3,136,287 6/1964 North _____ 115—41

CLAUDE A. LE ROY, *Primary Examiner.*

J. PETO, *Assistant Examiner.*